United States Patent [19]

Castore et al.

[11] Patent Number: 5,712,706
[45] Date of Patent: *Jan. 27, 1998

[54] LASER SCANNING METHOD AND APPARATUS FOR RAPID PRECISION MEASUREMENT OF THREAD FORM

[75] Inventors: Glen M. Castore, Roseville; Frederick A. Treiber, St. Paul; Barry L. Drake, Shoreview, all of Minn.

[73] Assignee: M&M Precision Systems Corporation, West Carrollton, Ohio

[ * ] Notice: The term of this patent shall not extend beyond the expiration date of Pat. No. 5,521,707.

[21] Appl. No.: 597,039

[22] Filed: Feb. 5, 1996

Related U.S. Application Data

[62] Division of Ser. No. 263,254, Jun. 21, 1994, Pat. No. 5,521,707, which is a continuation of Ser. No. 127,445, Sep. 24, 1993, abandoned, which is a continuation of Ser. No. 748,247, Aug. 21, 1991, abandoned.

[51] Int. Cl.$^6$ ............................................. G01B 11/24
[52] U.S. Cl. ............................................. 356/394; 356/376
[58] Field of Search ............................. 356/375, 376, 356/237, 394, 242, 386; 250/563, 562, 572; 348/131

[56] References Cited

U.S. PATENT DOCUMENTS

| | | | |
|---|---|---|---|
| 3,918,816 | 11/1975 | Foster et al. | 356/375 |
| 4,315,688 | 2/1982 | Pryor | 356/237 |
| 4,544,268 | 10/1985 | Yamada et al. | 356/394 |
| 4,585,350 | 4/1986 | Pryor | 356/376 |
| 4,598,998 | 7/1986 | Kamei et al. | 356/237 |
| 4,644,394 | 2/1987 | Reeves | 358/101 |
| 4,717,240 | 1/1988 | Gilby | 350/163 |
| 4,721,388 | 1/1988 | Takagi et al. | 356/394 |
| 4,728,193 | 3/1988 | Bartelt et al. | 356/356 |
| 4,746,792 | 5/1988 | Dil | 250/231 |

OTHER PUBLICATIONS

Chapter 12 of the *Handbook of Dimensional Measurement* by Francis T. Farago, entitled "Screw Threads And Screw-Thread Measuring", Fifth Printing 1982, pp. 311-340.

Article entitled "Analysis and Solution of the Nongeneric Total Least Squares Problem" by S. Hussel and J. Vandewalle in SIAM of Anal. Appl. vol. 9 No. 3, Jul. 1988, p. 360.

*Primary Examiner*—Hoa Q. Pham
*Attorney, Agent, or Firm*—Rankin, Hill, Lewis & Clark

[57] ABSTRACT

A non-contact laser-based sensor guided by a precision mechanical system scans a thread form producing a set of digitized images of the thread form. The digitized images are analyzed to derive quantitative information about thread characteristics such as pitch, lead, root radius, flank angle, surface roughness, helix variation, and pitch diameter. Thread form data may be stored and later retrieved in order to provide traceability and verification of thread form measurements to a predetermined thread form specification. The apparatus and method of the invention can measure characteristics for shapes similar to threads, such as gears and dies used for cold forming processes. The thread measurement system can be mounted on thread making machines and used for on-line monitoring and control of the thread forming process.

4 Claims, 15 Drawing Sheets

LASER SCANNING METHOD AND APPARATUS FOR RAPID PRECISION MEASUREMENT OF THREAD FORM

This application is a divisional of application Ser. No. 08/263,254, filed Jun. 21, 1994 now U.S. Pat. No. 5,521,707, which is a continuation of application Ser. No. 08/127,445, filed Sep. 24, 1993, abandoned, which is a continuation of application Ser. No. 07/748,247, filed on Aug. 21, 1991, abandoned.

This invention relates to a method and apparatus for the rapid and precise measurement of thread form and more particularly to a non-contact measurement device for rapidly and precisely measuring and permanently recording the form of threads, gears, cold-forming dies, and similar manufactured objects.

BACKGROUND OF THE INVENTION

A thread such as on a screw or bolt has a shape and design that characterizes its contour in space, this contour is called thread form. Traditionally a machine tool operator or inspector checks a thread form by using mechanical contact gauges or an optical comparator. These labor intensive methods are not very repeatable and yield only minimal quantitative information about the thread form. The techniques to make thread form measurements require an individual that is highly trained.

In view of the special methods and means of measurement which the general design of screw threads involve, compounded by the large variety of parameters which may be specified as important and assigned different tolerance grades, the measurement of screw threads has developed into a distinct branch of dimensional measurement.

The prior art employed three broad categories of devices for measuring characteristics of thread form: mechanical gauges, optical comparators and video analyzers. Prior art methods are used for measurements that both indicate acceptance or rejection of a part or to gain some quantitative information about a part. The acceptance or rejection of a part is generally known as "accept/reject measurements" termed "inspection by attributes". The gaining of quantitative information about a part is termed "inspection by variables".

Different mechanical gauges are required for different thread types and sizes. Consequently manufacturer's employing the methods of the prior art must maintain an inventory of gauges and purchase new gauges as new thread forms are manufactured. Mechanical gauges are also subject to wear and, consequently they need to be replaced periodically.

Specific examples of thread form measurement devices of the prior art are listed and described below:

A. Solid Screw Thread Gauges

A solid screw thread gauge, which is built to correspond to the product thread size at maximum material limit, provides the assurance that any product assembled with that gauge will also assemble with the mating part. Examples of such devices are thread plugs and ring gauges. A measurement using such a device indicates whether the thread form is within a tolerance band, but provides none of the quantitative information needed for statistical process control, or, in some cases, part acceptance.

B. Indicating Screw Thread Gauges

Indicating screw thread gauges are manually operated measurement devices which show the amount by which the actual size of the gauged object differs from a previously set nominal size. Indicating screw thread gauges, as with other differential gauging instruments, require setting by means of master thread gauges which are manufactured to very close tolerances. If the data is to be recorded, the operator must write down the results. Indicating gauges are difficult to align so the results of a measurement are operator dependent.

C. Helical Path Analyzer

The helical path analyzer is a contact (stylus) instrument designed for detecting, measuring, and recording on charts all the potential errors of the screw thread helix over any three revolutions of the threaded member. The helical path analyzer can detect helix deviations which are consistent, periodic, erratic, or any combination of these types. A highly trained operator is required to set up and operate an instrument of this type.

D. Optical Comparators

Optical comparators incorporate a set of lenses which magnify an object placed in the field of view. The magnified image appears on a screen where it can be compared with templates or measured directly from the screen. Optical comparators exhibit the same characteristics as any optical train of lenses. There is a depth of field and features of the part outside the depth of field become fuzzy. As the magnification increases the depth of field becomes smaller and objects imaged near the edge of the lenses are slightly distorted by the lens geometry. These characteristics severely limit the set of thread characteristics which can be measured by an optical comparator and the accuracy to which they can be measured.

E. Video Analyzers

Other methods of the prior art utilize video scanning and analysis to examine and characterize thread form. U.S. Pat. No. 4,644,394 to Reeves entitled "Apparatus for Inspecting an Externally Threaded Surface of an Object" discloses an apparatus that utilizes a video camera mounted in a translational frame which is mounted on a rotational assembly. The video signals are digitized and processed while the camera scans the threaded surface for defects. Prior art video methods are limited to external threads and rely on a video image that has been digitized frame by frame. The prior art does not provide a direct measure of thread form to provide a digital profile of the thread. Prior art video methods can not be easily applied to the inspection of dies and gears (thread-like forms) as well as threads.

Therefore, due to the recited limitations of the prior art and due to the composite design of screw threads, comprising angular dimensions and contour forms in addition to linear dimensions, some of the latter being defined by reference points that are not directly accessible, it is the motivation of this invention to provide a laser based scanning method and apparatus for rapid precision measurement of thread form.

SUMMARY OF THE INVENTION

The invention provides a non-contact form of thread measurement that uses laser triangulation to quickly build a precise profile of a thread form. A non-contact laser-based sensor is computer controlled. The sensor is mounted on a precision mechanical system that guides the sensor. The precision mechanical system moves the sensor to scan the thread form producing a set of digitized images of a thread form that are digitally stored. The digitized images are analyzed to derive quantitative information about thread characteristics such as pitch, lead, root radius, flank angle, surface roughness, helix variation, and pitch diameter. Thread characteristics may be stored and later retrieved in order to provide traceability and verification of the part.

OBJECTS OF THE INVENTION

It is an object of the invention to provide an improved method of thread form measurement that determines whether thread parameters agree, within tolerance limits, with predetermined design dimensional specifications.

It is a further object of the invention to provide an improved method of thread form measurement that measures composite screw threads, comprising angular dimensions and contour forms in addition to linear dimensions, some of the latter being defined by reference points that are not directly accessible.

It is a further object of the invention to provide an improved method of thread form measurement that uses a non-contact laser measuring device to rapidly and precisely measure, and permanently record, the form of threads, gears, cold-forming dies, and similar manufactured objects.

It is still another object of the invention to provide an improved method of thread form measurement that is automated and less labor intensive than traditional methods of the prior art.

It is yet a further object of the invention to provide an improved method of thread form measurement that is highly repeatable and yields quantitative information about thread form.

It is yet another object of the invention to provide an improved method of non-contact thread form measurement.

It is still a further object of the invention to provide an improved method of thread form measurement that utilizes triangulation distance measurement.

Other objects, features and advantages of the present invention will become apparent to those skilled in the art through the Description of the Preferred Embodiment, Claims, and drawings herein wherein like numerals refer to like elements.

DESCRIPTION OF THE PREFERRED EMBODIMENT

Figure 1A:
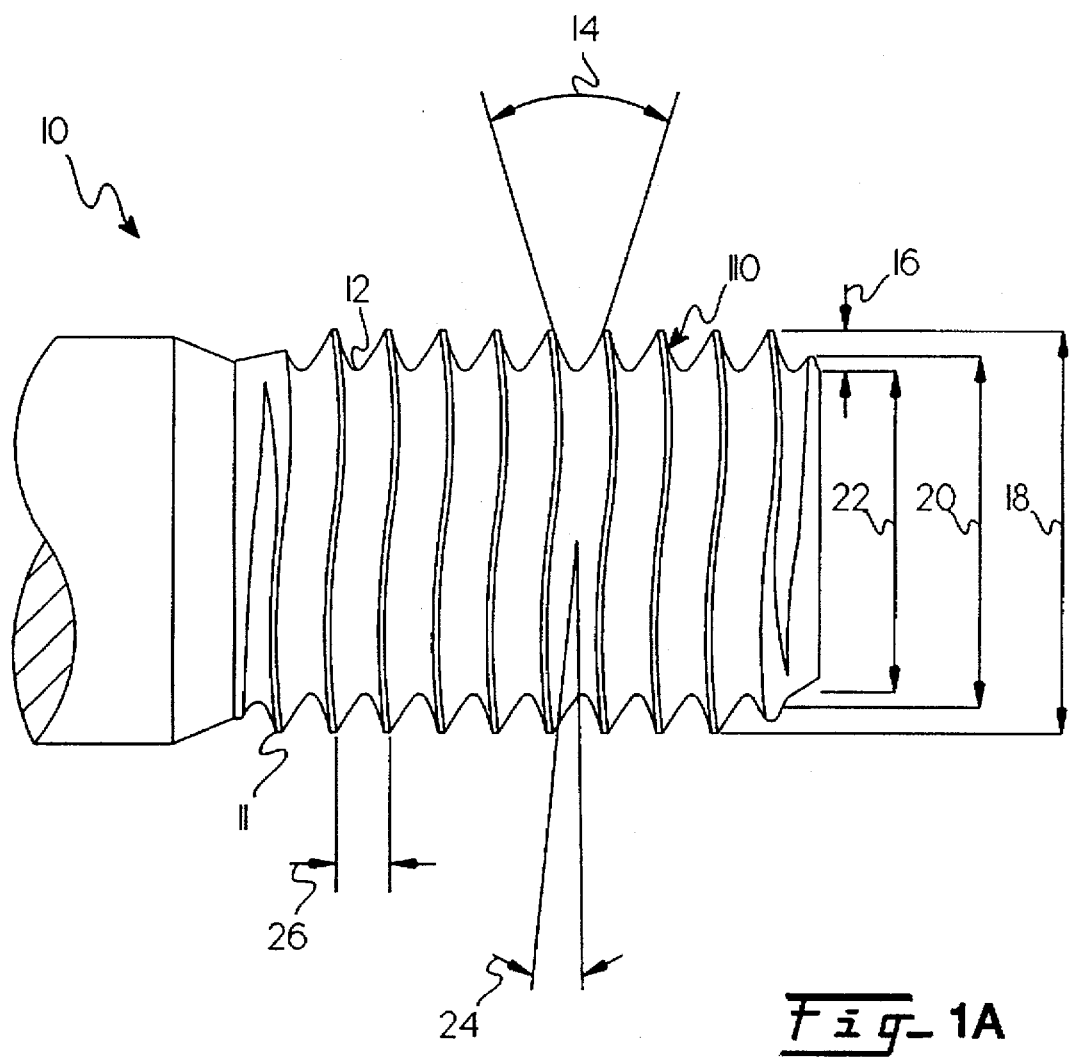
FIG. 1A shows an example of a thread form with thread form parameters defined.
Figure 1B:
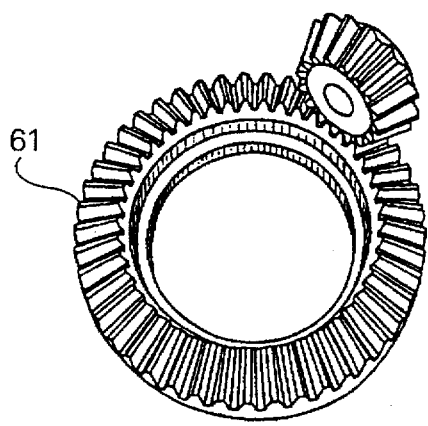
FIGS. 1B-1J show different examples of thread forms that can be measured with the method and apparatus of the invention.
Figure 1C:
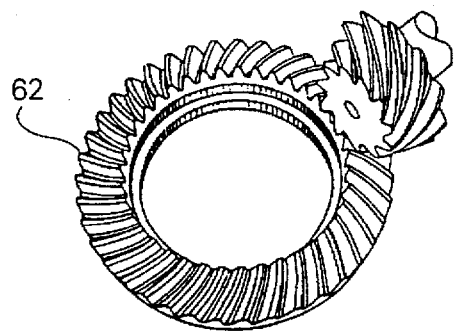
Figure 1D:
Figure 1E:
Figure 1F:
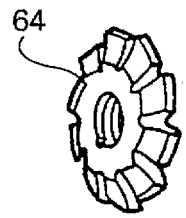
Figure 1G:
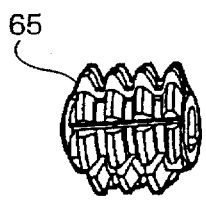
Figure 1H:
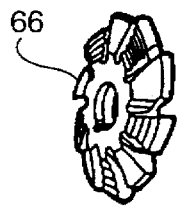
Figure 1I:
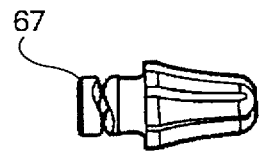
Figure 1J:
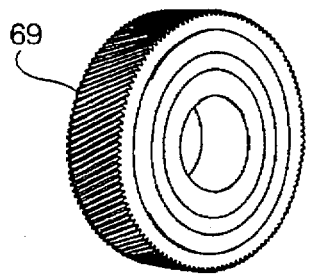

FIG. 1A shows an example part 10 having a thread 11 with thread form 110, the measurement of which is the subject of the invention. The laser based scanning method and apparatus of the invention provides rapid non-contact measurement of thread characteristics such as: root radius 12, pitch 26, helix angle 24, root to crest height 16, flank angle 14, pitch diameter 20, major diameter 18, minor diameter 22, surface roughness, helix variations, and variations in thread form. The thread form measurement apparatus and method of the invention can measure a wide-range of different external and internal thread sizes and types while requiring minimal operator training.

The invention can be used to measure other thread like parts such as those depicted in FIGS. 1B-1J. The following items are depicted in FIGS. 1B-1J: a straight bevel gear 61, a spiral bevel gear 62, a worm gear 63 a gear tooth cutter 64, a gear hob 65, a gear tooth stocking cutter 66 a form-relieved cutter 67, a shaft with splines 68, a cold forming die for gear manufacture 69. The example threads illustrated in FIGS. 1B-1J are by way of example and not limitation and those skilled in the art will appreciate that other thread forms can also be measured with the method and apparatus of the invention.

Figure 2:
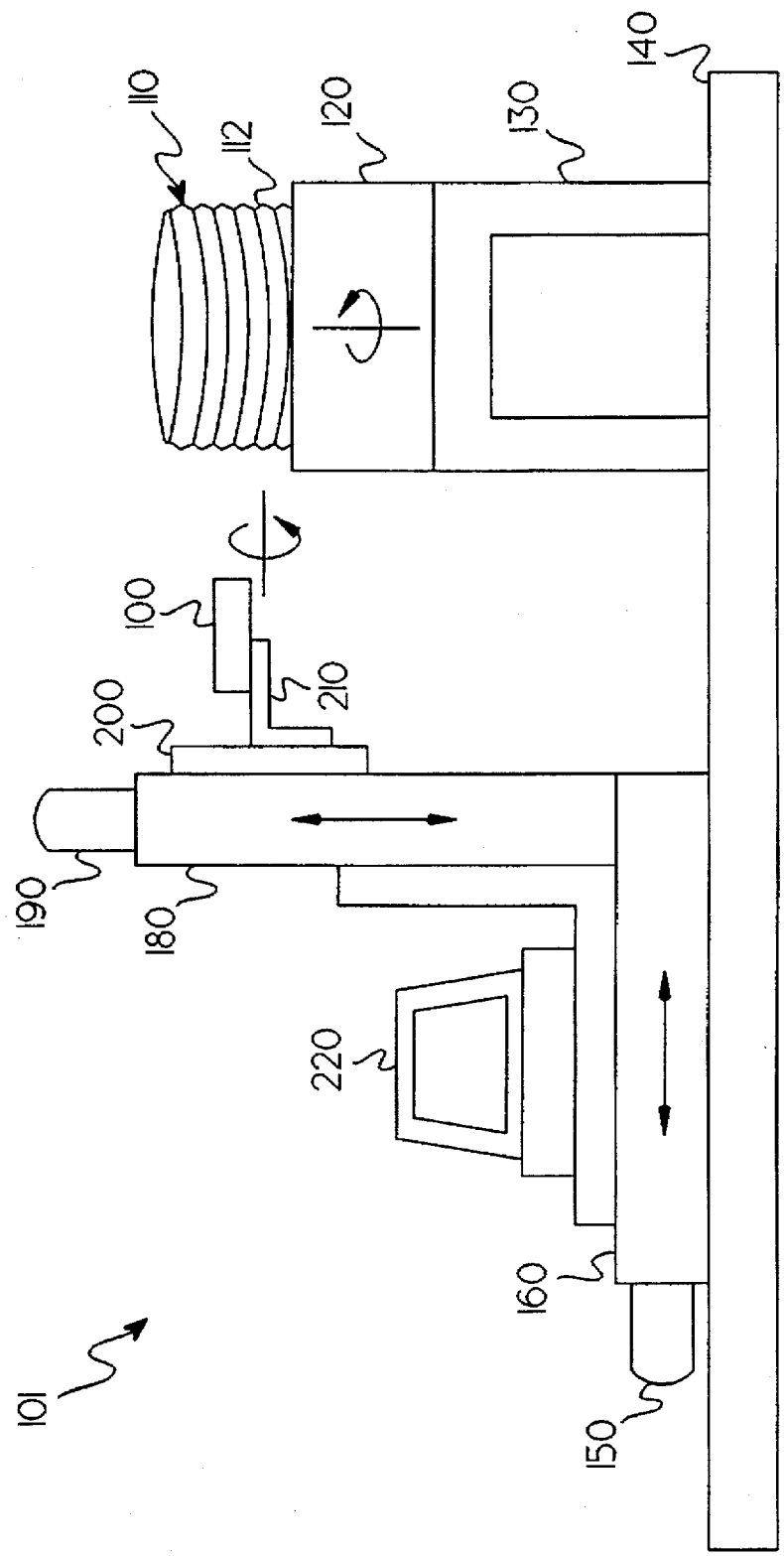
FIG. 2 shows a schematic side view of one embodiment of the invention showing a laser triangulation probe mounted on two linear stages and a rotary stage.

Now referring to FIG. 2 which shows the non-contact thread measurement apparatus 101 of the invention in a schematic representation. The invention comprises a base plate 140 upon which a horizontal linear motion stage 150 has been affixed. A part having a threaded surface 110 to be measured is held by a part rotary motion stage 120 which is attached to the base plate 140. The horizontal linear motion stage 160 is driven by horizontal drive motor 150. The vertical linear motion stage 180 is fastened to the horizontal linear motion stage 160 substantially to accomplish motion in a plane parallel to both the horizontal and vertical axis of the non-contact thread measurement apparatus 101. The vertical linear motion stage 180 is driven by vertical drive motor 190. A rotary motion stage 200 is attached to the vertical linear motion stage 180. Bracket 210 holds a laser distance measuring apparatus 100 to the detector rotary stage 200 such that when the rotary stage 200 moves, the laser distance measuring apparatus 100 rotates about an axis perpendicular to the linear stage 180. The laser distance measuring apparatus 100 is advantageously positioned to scan the threaded surface 110 to be measured.

A controller 220 is included that controls the vertical linear motion stage 180, the horizontal linear motion stage 160, the part rotary motion stage 120 and the detector rotary motion stage 200. The rotary stages 120 and 200 can be well known manually operated or motor-driven units.

In the operation of this preferred embodiment of the invention the laser distance measuring sensor scans across the threaded surface 110 by moving the part 112 relative to the laser distance measuring device 100. In other alternate embodiments of the invention the part 112, or the laser distance measuring apparatus 100, or both can move.

Those skilled in the art will recognize that the vertical drive motor 190 and horizontal drive motor 150 can be constructed from a stepper motor or servo motor, but could be any linear actuating device able to be controlled by the controller 220. Those skilled in the art will recognize that the detector rotary motion stage 200 and the part rotary motion stage 120 can be constructed from pneumatically driven, hydraulically driven, or electrically driven rotary motion devices, but could be any rotary actuating device controllable by the controller 220.

Figure 3:
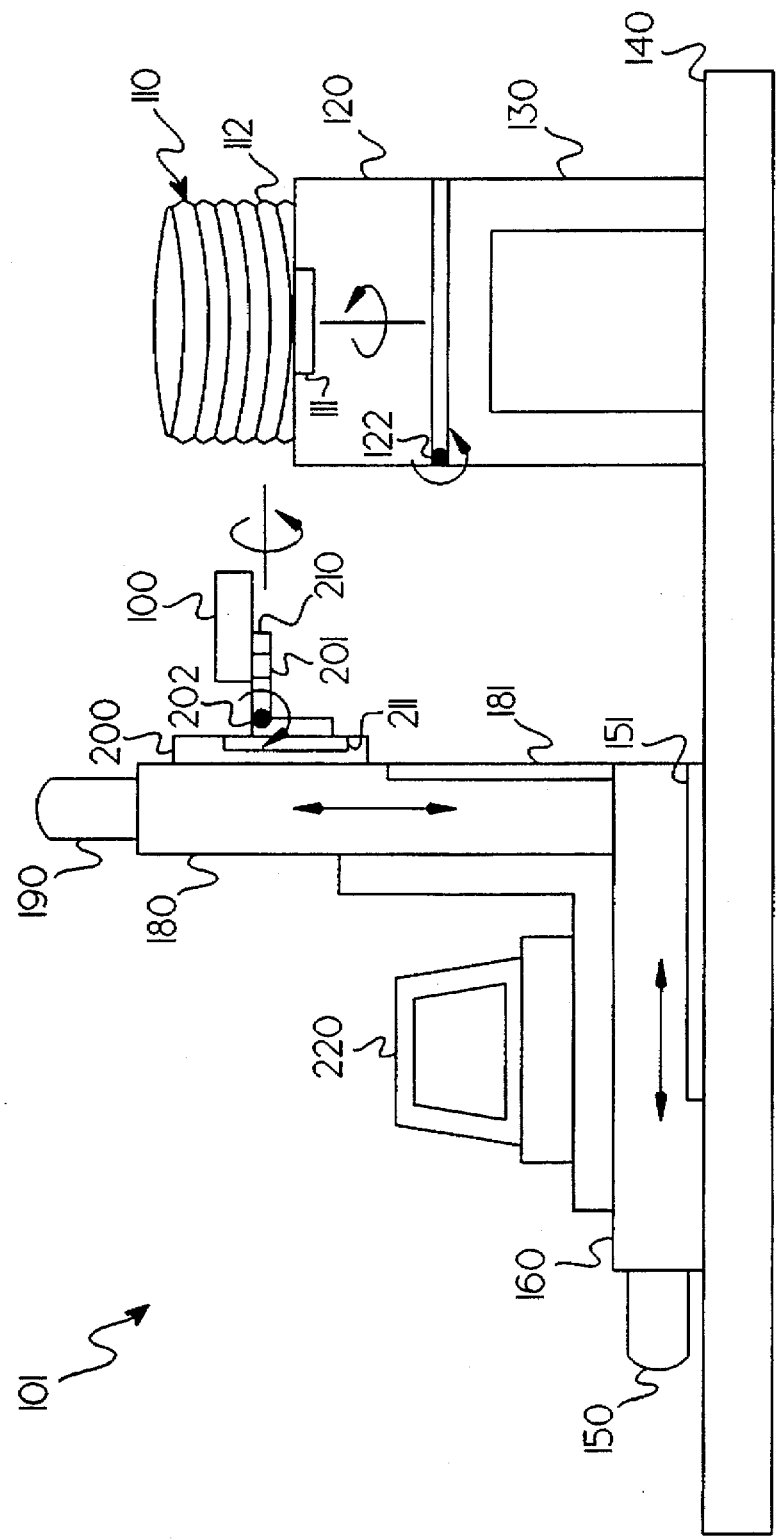
FIG. 3 shows a schematic side view of one embodiment of the invention showing a laser triangulation probe mounted on two linear stages and a rotary stage including a second rotary stage mounted to the laser triangulation probe and a third rotary stage mounted to the part stand.

In an alternative embodiment of the invention, shown in FIG. 3, the laser distance measuring device 100 is attached to an additional rotary motion stage 202 which provides an additional degree of freedom during part scanning. Rotary motion stage 202 rotates about an axis perpendicular to the axis of rotary motion stage 200. Rotary motion stage 202 rotates about an axis perpendicular to the axis of rotary motion stage 200. The additional rotary motion stage 202 is attached to the detector rotary motion stage 200.

In yet another alternative embodiment of the invention a further additional rotary motion stage 122 which provides an additional degree of freedom during part 112 scanning may be included. The further additional rotary motion stage 122 is attached to the part rotary motion stage 120 in this alternative embodiment of the invention.

The positioning elements of the method of the invention serve to maintain a predetermined distance, called the depth of focus, between the laser distance measuring device 100 and the threaded surface 110. The laser distance measuring device 100 typically has a depth of focus which can range from 0.030 inches to 0.75 inches or more. Those skilled in the art will appreciate that the examples given relative to the depth of focus of the laser distance measuring device 100 are by way of example and not limitation and that specifically different laser distance measuring devices having various depths of focus can be used without deviating from the spirit and scope of the invention.

The positioning elements of the invention, through a closed loop method, maintains the focus of the laser optical system by altering the distance of the probe 100 from the thread surface 110 being measured. Close loop feed back control systems for positioning are well known in the art.

Figure 4:
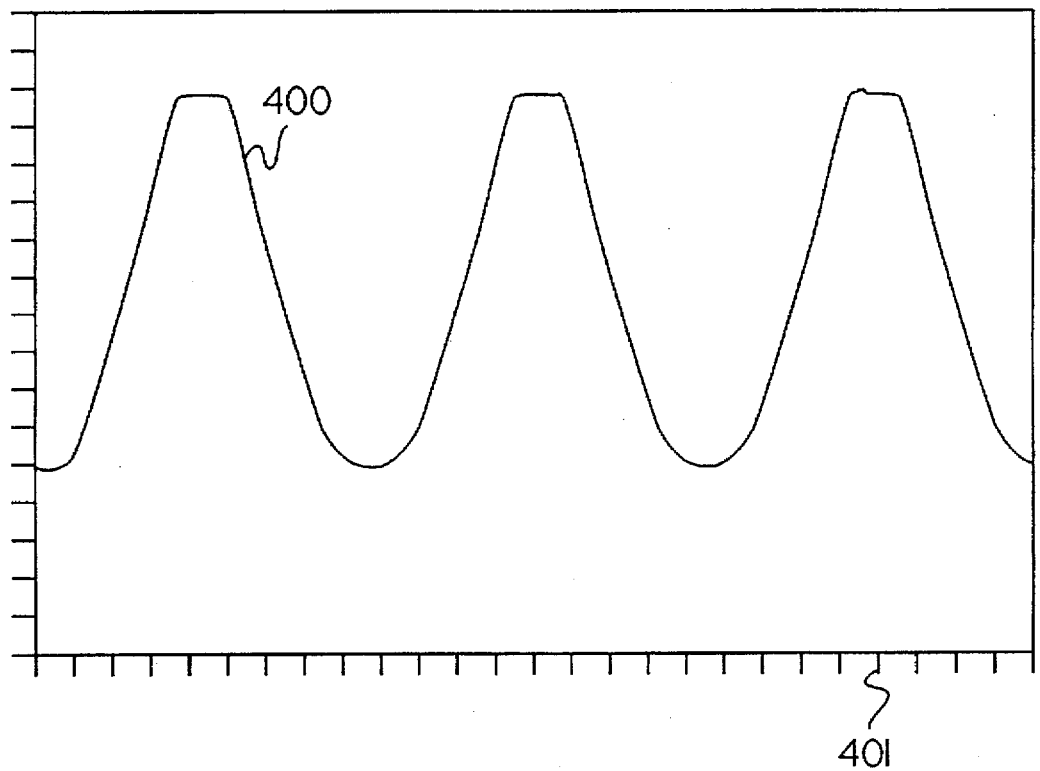
FIG. 4 shows an example of a thread form digitized by the method of the invention.

Now referring both to FIG. 3, which shows an alternative embodiment of the invention, as well as FIG. 4, which shows a profile of a thread as digitized by the laser distance measuring device 100. Profile 400 shows various aspects of the thread in a cross section plotted over distance 401. As the laser distance measuring apparatus 100 moves over the part 112, the distance from the laser distance measuring apparatus 100 to the part 112 is measured and sent to the controller 220. The distance measured is shown in FIG. 4 as profile 401. In one embodiment of the invention the accuracy of the laser distance measuring apparatus 100 ranges from 0.000020 inches (20 micro-inches) to 0.00020 inches (200 micro-inches) depending on the sensor optics. This distance information is correlated with the position of the laser distance measuring apparatus 100, as measured by well known linear encoders 181 and 151 and rotary encoders 201, 211 and 111.

If the part 112 dimensions or tolerances require high precision measurement, software error compensation algorithms are used to calculate and apply dimensional corrections to the raw data gathered from the laser distance measuring apparatus 100 and the position measuring system for the linear and rotary stages. Those skilled in the art will recognize that various different error compensation mechanisms could be used that would provide an improvement in dimensional measurement. One such error compensation method used in the preferred embodiment of the invention is the Total Least Squares method. A good description of the Total Least Squares method can be found in an article by Sabine Van Huffel and Joos Vandewalle in the Society for Industrial and Applied Mathematics Journal of Matrix Analysis and Applications, Vol 9, No. 3 July 1988. The Total Least Squares method provides a way of solving overdetermined sets of linear equations when errors are in both the observation matrix and the data matrix. In the case of the preferred embodiment, these may include environmental errors and machine errors. The compensated data is then converted into a digitized profile of the thread 110, in the frame of reference of the threaded workpiece 112 being measured. Other tests for measuring perturbations in machine geometry due to thermal effects, changes in weight distribution, etc. are described in Draft ANSI Standard: ANSI/ASME B5.54-1991 entitled "Methods of Performance Evaluation of Computer Numerically Controlled Machine Centers".

From the method of the invention the digitized image 400 of the thread form 110 can then be analyzed either interactively or automatically. The measurement information can be stored in a database and is then available for statistical analysis, for reports, for traceability verification to standards, or for process analysis.

Figure 5A:
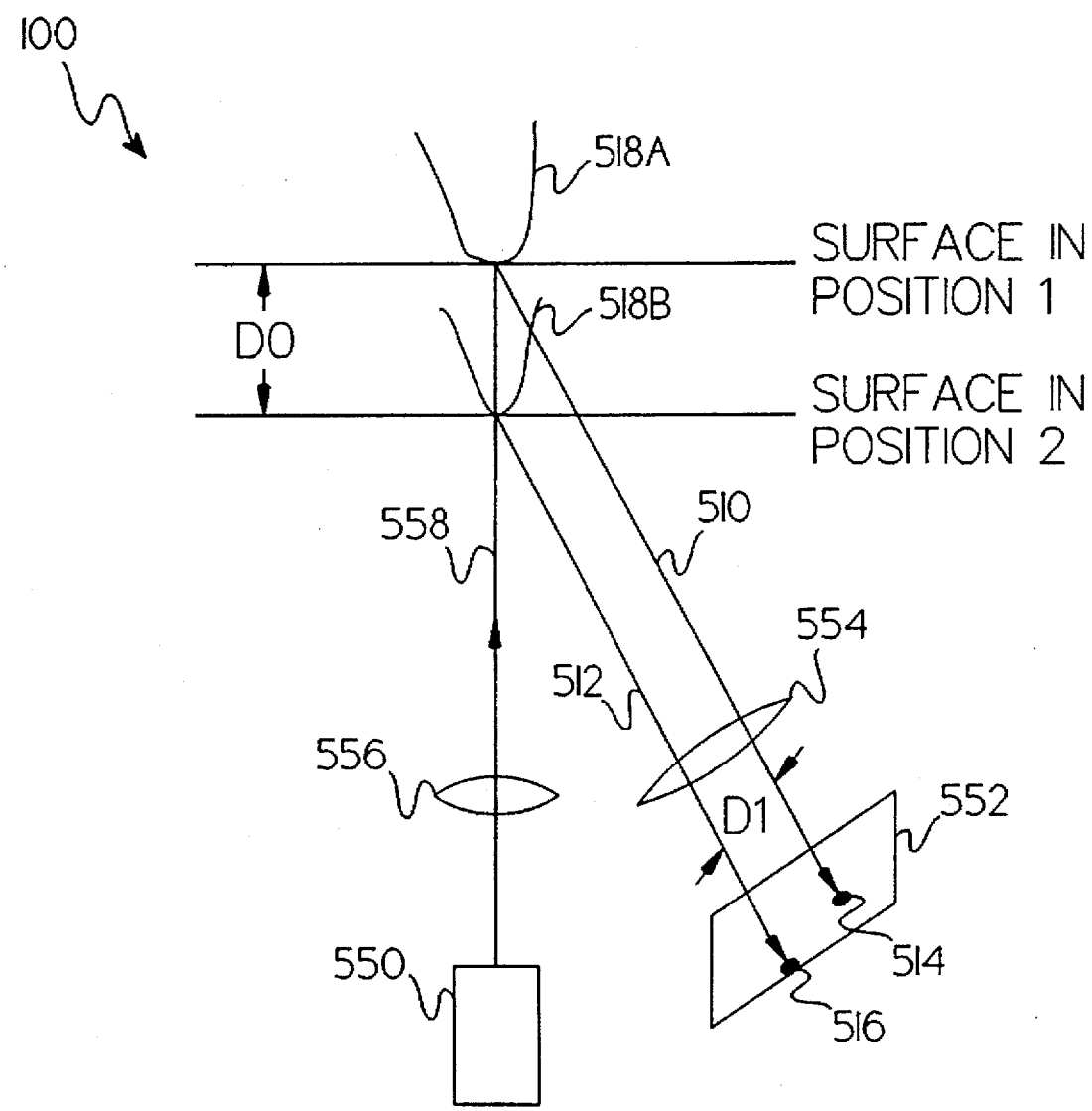
FIG. 5A shows a schematic example of one form of laser triangulation used in the thread form measurement method and apparatus of the invention.
Figure 5B:
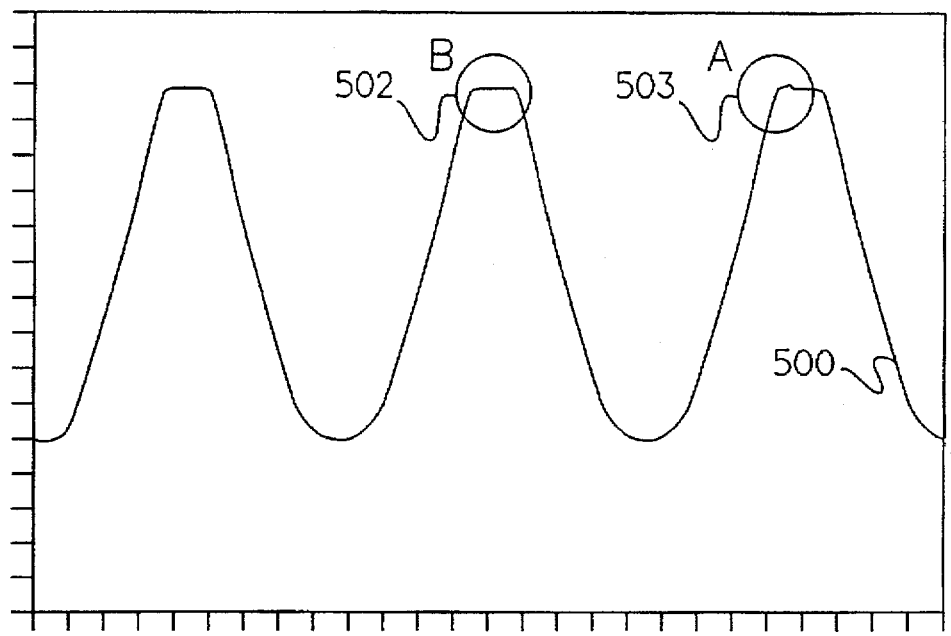
FIG. 5B shows an example of thread form digitized by the method of the invention showing various defects in thread form.

Now referring to FIG. 5B which shows a profile 500 of a thread as measured by the method of the invention. The non-contact thread measurement apparatus 101 can detect deviations from the ideal thread form such as exceptionally rounded crests, asymmetry in the root form, and bumps on the thread flank. An example of such defects that have been detected by the method and apparatus of the invention is shown in FIG. 5B. A correctly formed crest is shown at 502. A slightly rounded crest 503 is shown as a deviation in crest sharpness.

These deviations in thread form can be associated with characteristics of the manufacturing process such as the wear of a grinding wheel or cutting tool, programming error in computer controlled equipment, or misalignment in fixturing the workpiece 112. This information can be used to correct the thread manufacturing process.

Now referring to FIG. 5A which shows a schematic of the laser distance measuring apparatus 100 of the method of the invention. The laser triangulation gauge consists of a laser source 550, a receiver sensor 552, and optics 554 and 556 which form the outgoing beams 558 and incoming beams 510, 512. The receiver 552 images the diffuse reflection of the spot 514 created by the laser beam on the surface. When the surface 518a is in position 1 the image falls primarily on spot 514 on the receiver 552. When the surface 518b moves closer to position 2 the image on the receiver 552 shifts to position 516. The distance D1 of the shift on the receiver 552 is proportional to the distance D0 the surface moved from position 1 to position 2. The laser triangulation distance measuring method of the invention relates D1 and D0 to thread profile.

The output from the sensor 552 can be either analog or digital. A good example of a receiver sensor is the CyberOptics sensor unit model number PRS 150 which uses a 64×512 array of charge coupled devices (CCD array) as the imaging sensor available from CyberOptics Corp. of Minneapolis, Minn. Those skilled in the art will appreciate that other types of laser imaging sensors may be used and the example given of a 64×512 CCD array is by way of example and not limitation.

Figure 5C:
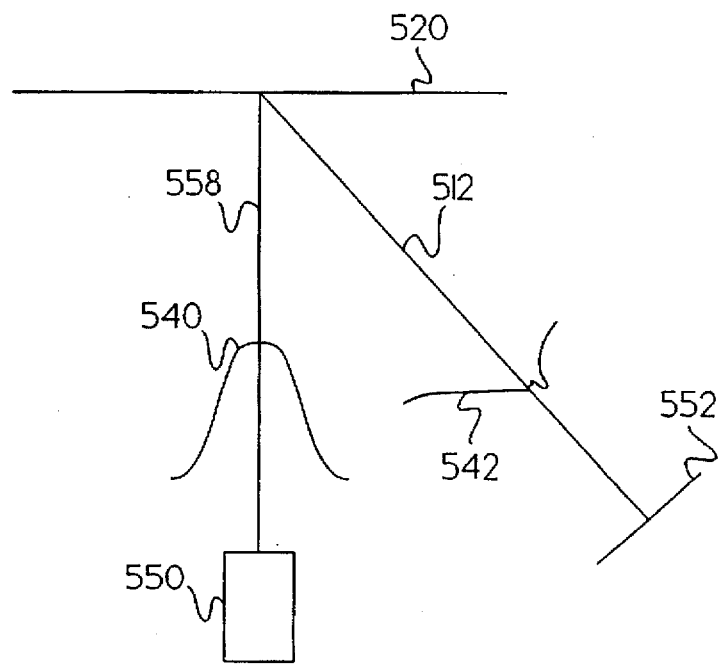
FIG. 5C shows a Gaussian power distribution for the laser beams of the method of the invention.

The triangulation method of the invention locates the spot on the receiver using an averaging operation shown in FIG. 5C. The output beams 512 and 510 have a diameter, say 1 mm, with a Gaussian power distribution across that diameter 542. The beam 558 is distorted as it is reflected from the surface 520. Therefore, it is necessary to perform an averaging operation well known in the prior art to determine a best estimate for the center of the spot on the receiver. The technique that CyberOptics has developed for doing this is faster, works well on many types of surfaces, and provides an adequate range of accuracy.

Figure 6A:
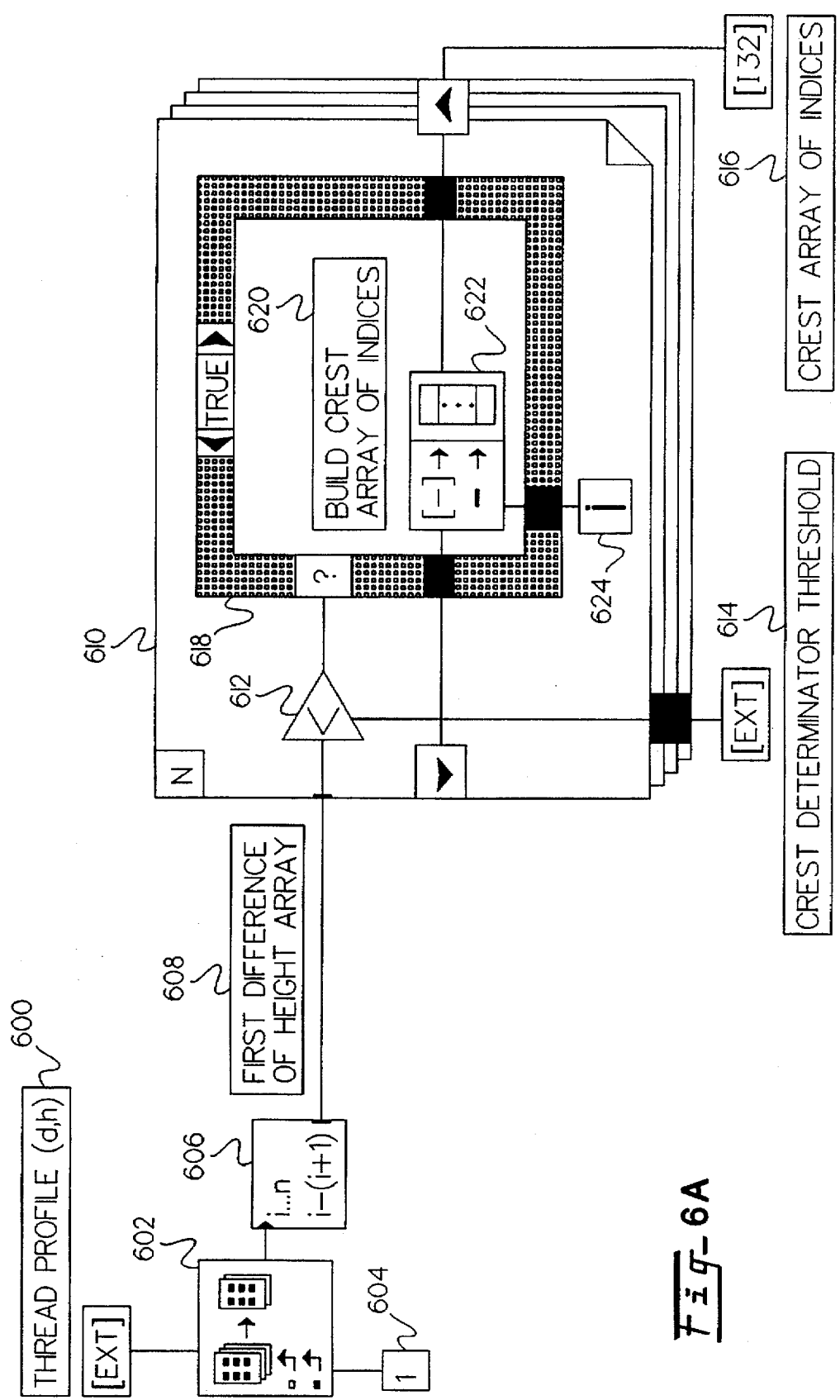
FIG. 6A shows a process flow diagram of the method of determining the thread crest given the profile of the thread.
Figure 6B:
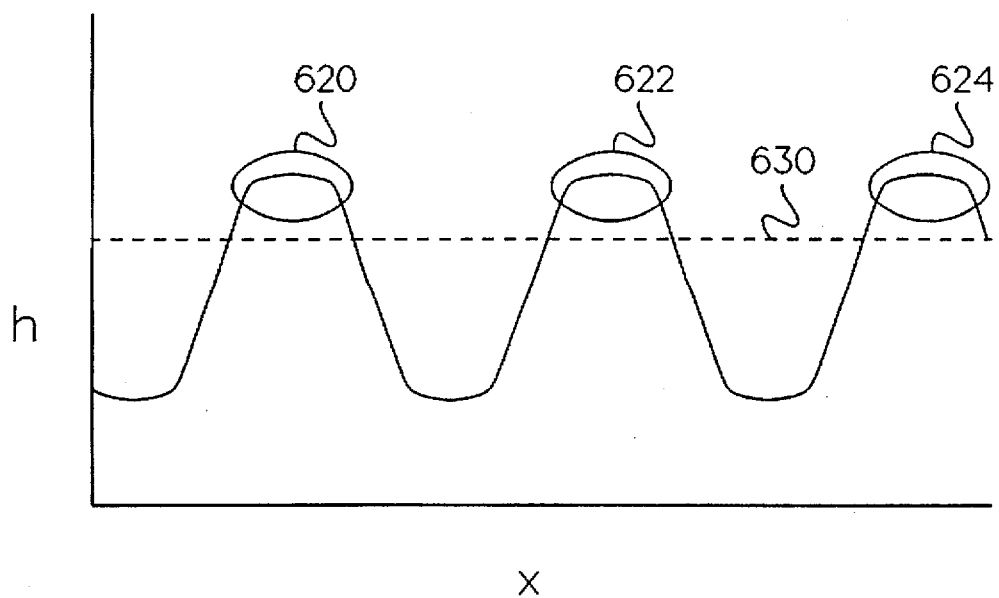
FIG. 6B shows a digitized profile of thread form resulting from the method of the invention.

Referring now to FIG. 6a which shows the method of determining the crest height from the data obtained from the laser triangulation method described earlier. The method of determining the crest height utilizes information that is in the form of an array of points which represent the profile of the thread or object being inspected. The profile array of points are given as a couple of X, which is displacement, and H which is height. A graph of a set of points which constitute the crests of the thread is shown in FIG. 6B. The method of determining the crest given the profile data starts by imputing from the laser triangulation method a thread profile 800 shown as process block 600. The process shown in FIG. 6a then initializes the first data point at process block 604 and in process block 606 the first difference of the array heights for all elements of the thread profile 600 are analyzed. In process block 608 the first difference of array height is fed to a comparator 612 which compares the differences of array height with a crest threshold determiner 614. The process 610 determines the crest array of indexes 616. The crest array of indexes results from a determination of the comparison between the crest determiner threshold 614 and the first difference of array height 608. If the crest determiner threshold 614 is less than the first difference of array height then the process enters block 618 where the crest array of indexes are computed 622. If the threshold is not exceeded then the variation in thread height has an unacceptable amount of error, because the error is greater than the thread height, an error indication is sent to the operator. All thread profile elements are fed through the process and result in a crest array of indexes 616.

Referring now to FIG. 6B where the set of points which constitutes the crests of the thread are shown plotted as H verses X to be seen at points 620, 622 and 624. The algorithm of FIG. 6B determines the crest height to be above a certain threshold 630.

Figure 7:
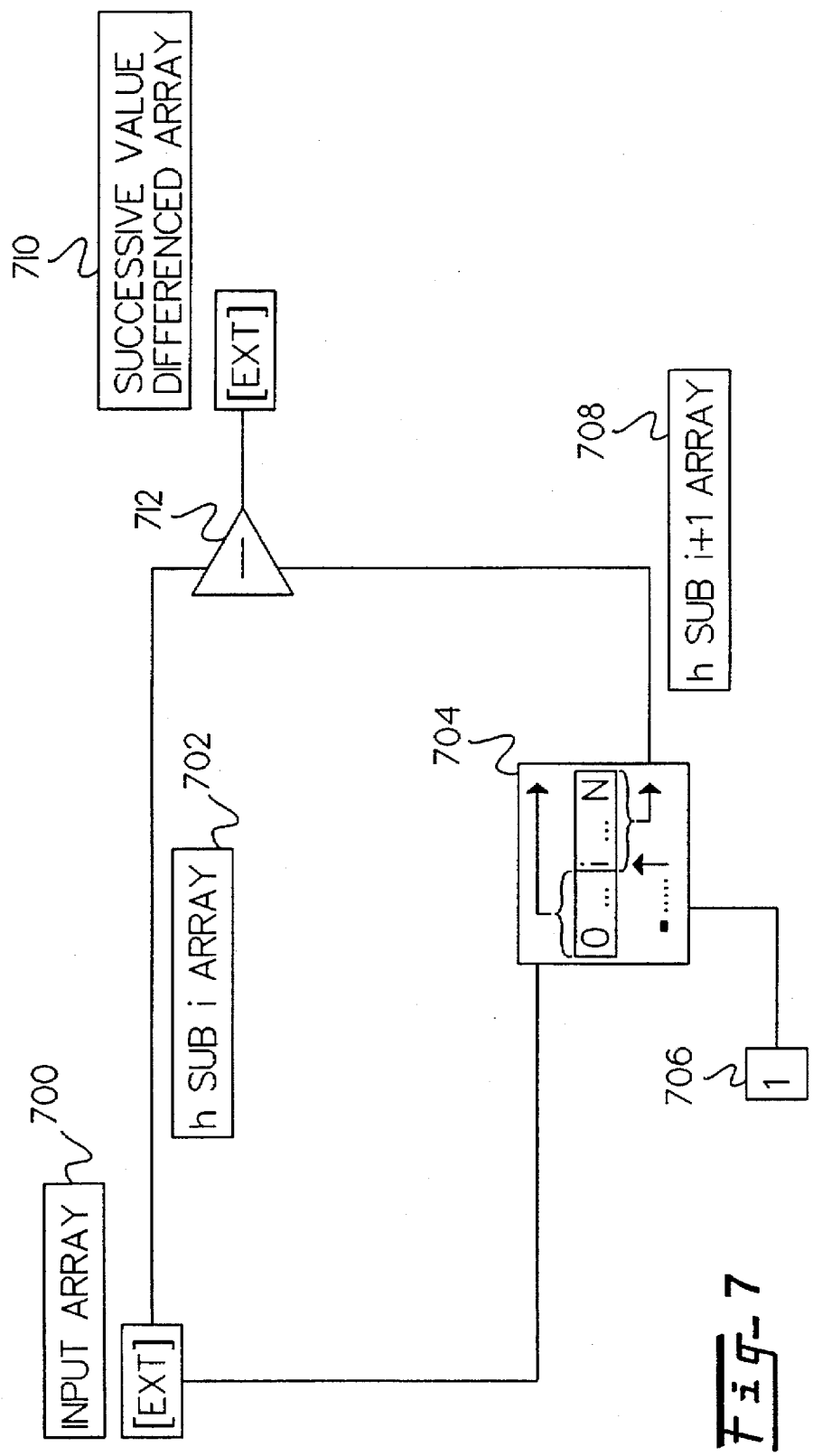
FIG. 7 shows a process flow diagram of the method of the invention to calculate the first difference of the input array.

Now referring to FIG. 7 which shows a block diagram of the method of the invention to calculate the first difference of the thread profile input array. At process block 700 the array is input. The successive value difference array 710 is computed as the difference between any position in the array from the next position in the array shown in block 708. The array is scanned from the first point 706 to the last point 704.

Figure 8:
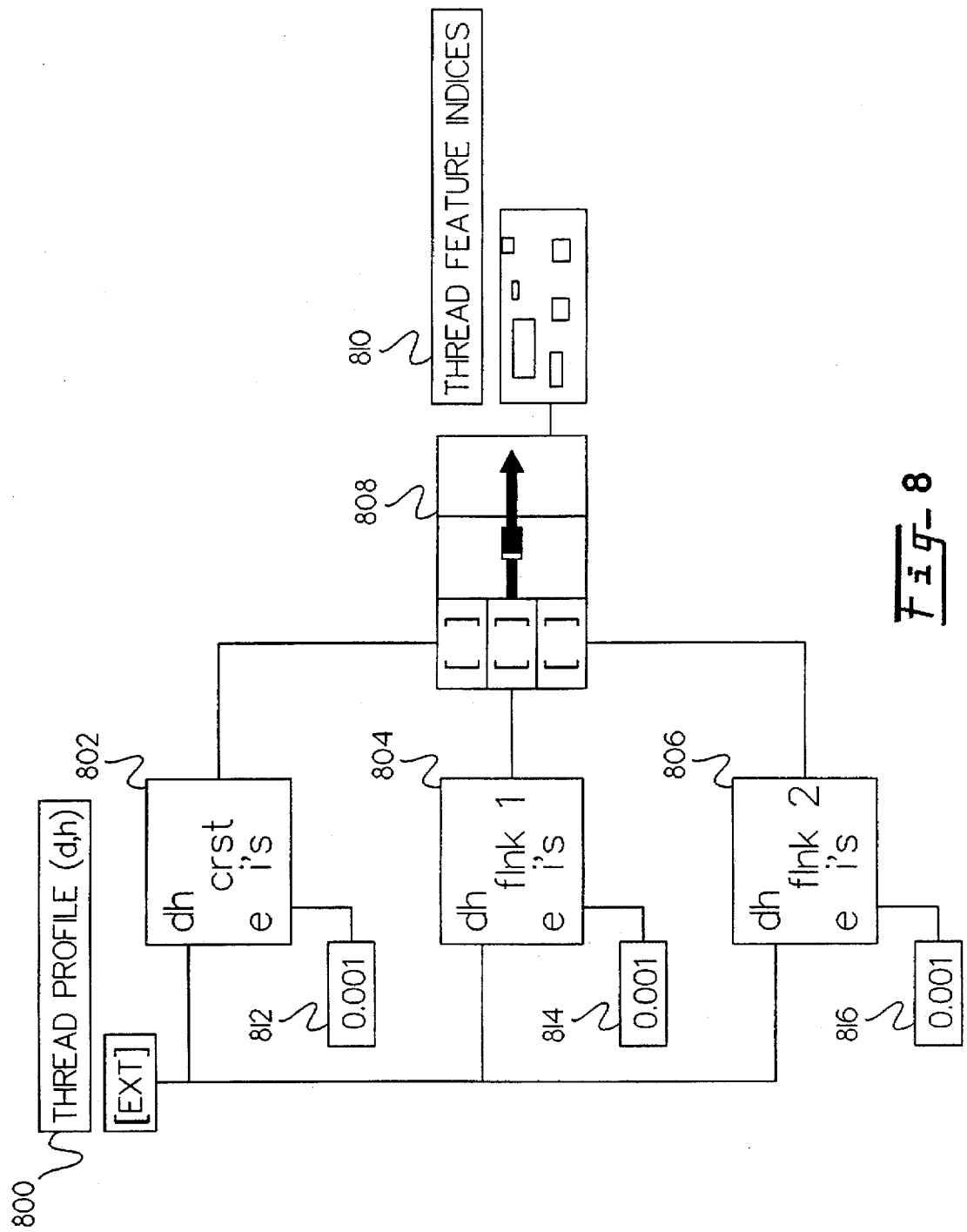
FIG. 8 shows a process flow diagram of the method of the invention to extract the features of crest, flank and root from the digitized profile of thread form.

Now referring to FIG. 8 where the method of the invention for extracting the figures of crest, flank and root from the digitized form of the thread profile is shown. The process starts by imputing a thread profile 800 in which the crest is evaluated in 802, the flank is evaluated in 804 and the root is evaluated in 806. The thread profile is a two dimensional array. The crest is evaluated by forming the first and second differences of thread height. The crest is defined by the first difference being nearly zero. The first flank is defined as having a constant negative slope with the second difference of array height in the area of the first flank will be near zero. The second flank is defined as having a constant positive slope with the second difference of array height in the area of the second flank near zero as well. The root is defined as the end of the second flank and the start of the next first flank. The thread feature indices 810 are allocated in process block 808. Thread features include a list of crest, root and flank values repeated for the entire thread profile.

Figure 9:
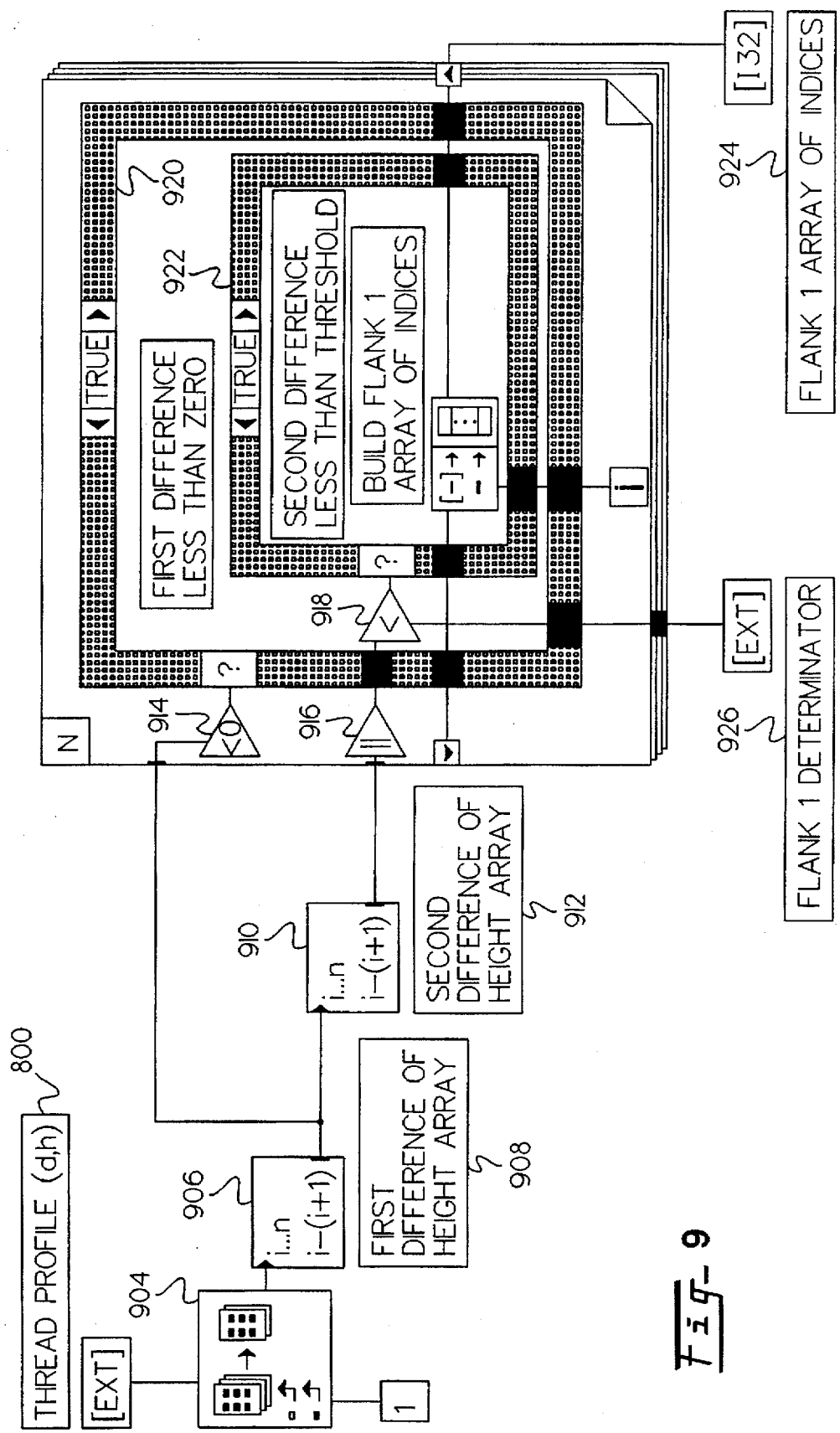
FIG. 9 shows a process flow diagram of the method of the invention to extract the thread flank features from the profile of thread form.

FIG. 9 shows a process diagram for extracting the thread flank features from the profile data. The thread profile data 800 is imputed and is processed through all elements of the thread starting from the first 904 to the last 906. The first difference of array height 908 is scanned for all elements in array 910 and a second difference of array height 912 is calculated. The first difference of array height is input to the process block 920 where a condition is checked for whether or not the first difference of array height is less than zero. If this is true, then the process flows to block 922 where there is a check made for the second difference of array height greater than the flank 1 diameter 926. The second difference of array height is less than a threshold value an acceptable noise value determined in process block 922 then the flank 1 array of indices is generated in 924.

The Thread Measurement System can be operated in three modes: Set-up, Calibration, and Measurement.

Figure 10:
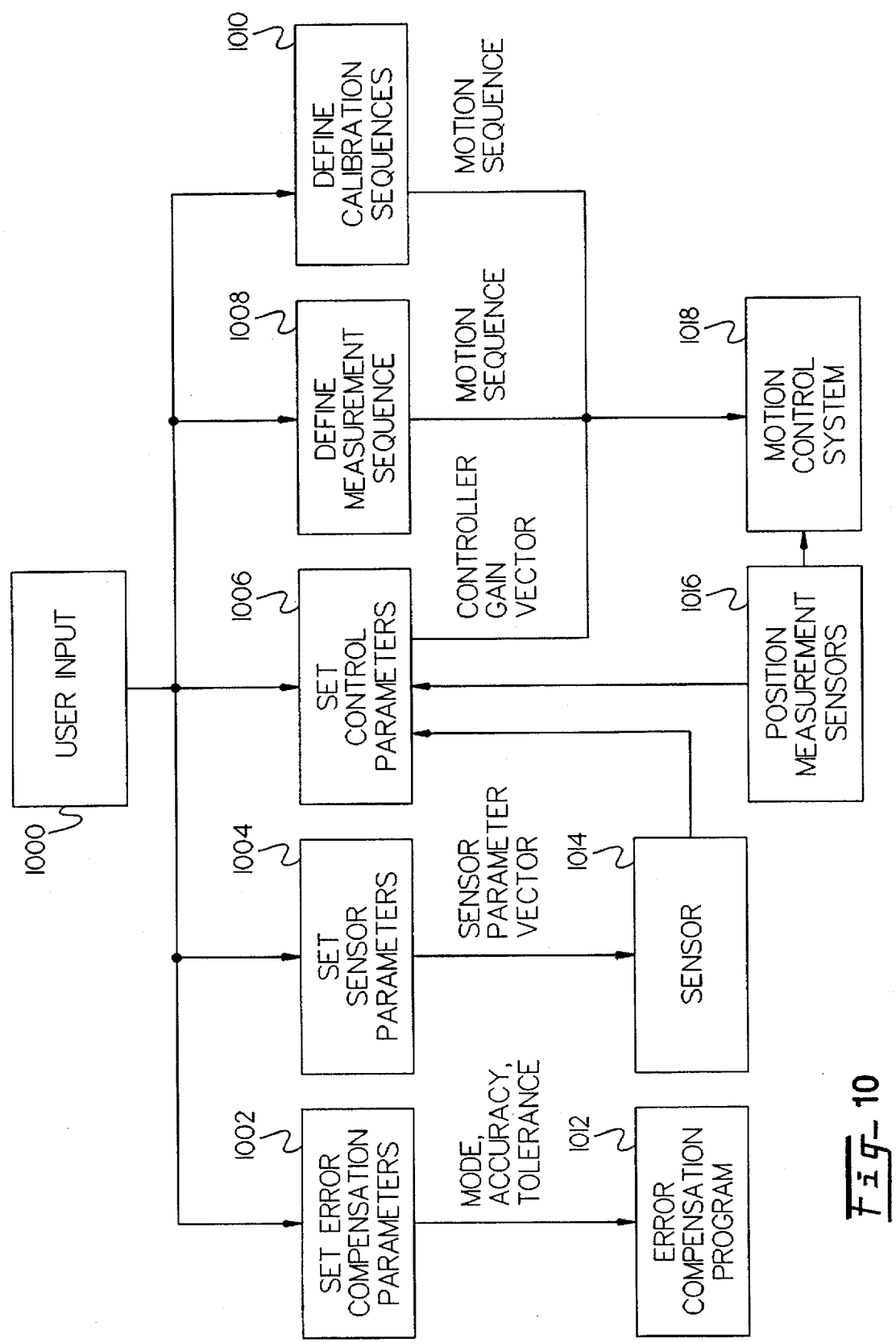
FIG. 10 shows a process flow diagram of the method of the invention to setup the apparatus of the invention.

Now referring to FIG. 10 which shows the setup mode of the invention. The process in FIG. 10 starts with the user input at 1000 which can flow to five possible subfunctions. The first subfunction is to set up error compensation parameters at 1002. The second subfunction is to set up sensor parameters at 1004. The third subfunction is to set control parameters at 1006. The fourth subfunction is to define measurement sequences at 1008. The fifth subfunction is to define calibration sequences at 1010. Referring to process block 1002 the error compensation parameters of mode, accuracy and tolerance are sent to the error compensation program at 1012. Referring now to the set sensor parameters 1004, the sensor parameter vectors are sent to the sensor at 1014. The sensor then sends data to the set control parameters block 1006. The position measurement sensors 1016, which could, in alternate embodiments of the invention, be glass scales or capacitive measurement devices, laser triangulators or interferometers input data to the set control parameters at 1006. The controller gain vector is then sent to the motion control system at 1018. Referring now to the define measurement sequence block 108 the motion sequences are also sent to the motion control system at 1018. Now referring to the define calibration sequences 1010 which sends motion sequence data also to the motion control system 1018. The position measurement sensors send position information also to the motion control system 1018. User inputs include critical dimensions, thread type tolerances, dimensions and length of scan and the number of parts per hour, the job identification, the operator name, the customer, the time and date, and the report format to output a thread form report.

In set-up mode the operator enters basic data about the measurements to be made. This includes the type of thread, dimensions designated as critical, tolerances, the length of a scan. Administrative information is also entered at this time. This would include customer name, job number, operator name, date, and the format in which the measurement information is to be presented.

The thread measurement apparatus of the invention can either dynamically or statically compensate for variations in system component orientation or measure. Dynamic compensation adjusts for deviation in "perfect" system features such as encoder orientation or position each time a measurement is taken. That is the error in encoder orientation is sensed and updated each computation cycle. In Static compensation the error in encoder orientation is measured once a day, for instance, and is applied to profile measurements until another Static compensation measurement is taken. Thus the distinction between Static and Dynamic compensation is a matter or frequency of measurement.

The information entered in the set-up mode is sent to a number of software modules, as indicated in FIG. 10, which automatically generate the following information:

1. Sensor parameters such as exposure time and spot size are generated in module 1004.
2. The error compensation mode is determined in module 1002.

If the mode is set to Static, the calibration procedures, used to determine the compensation factors, are automatically generated. If the error compensation mode is set to Dynamic, the programs which will monitor and calculate the real time error are initialized and tested. Error compensation can also be set to off. In this case the accuracy of the measurements is determined by the accuracy of the mechanical systems and the accuracy of the optical systems of the thread measurement apparatus of the invention.

3. Motion sequences are calculated which will cause the sensor and part to move along paths enabling the desired information to be measured in module 1008. The particular motion sequence depends on part geometry. The primary objective is to have the sensor travel the appropriate trajectory as defined following a predetermined scan approach. The correct approach for a scan of a thread is an axial approach. The trajectory should parallel the part to accurately gauge the part. The trajectory has to be parallel to the axis of the part. For a thread, the appropriate trajectory is an axial scan of the thread. As an alternate example, the trajectory of the scanner should be tangential to the nominal surface of a turbine blade. The sequence is stored to be used when the system is switched into measurement mode.

When the set up stage is complete the operator can store the set up information and enter either calibration or measurement mode.

Figure 11:
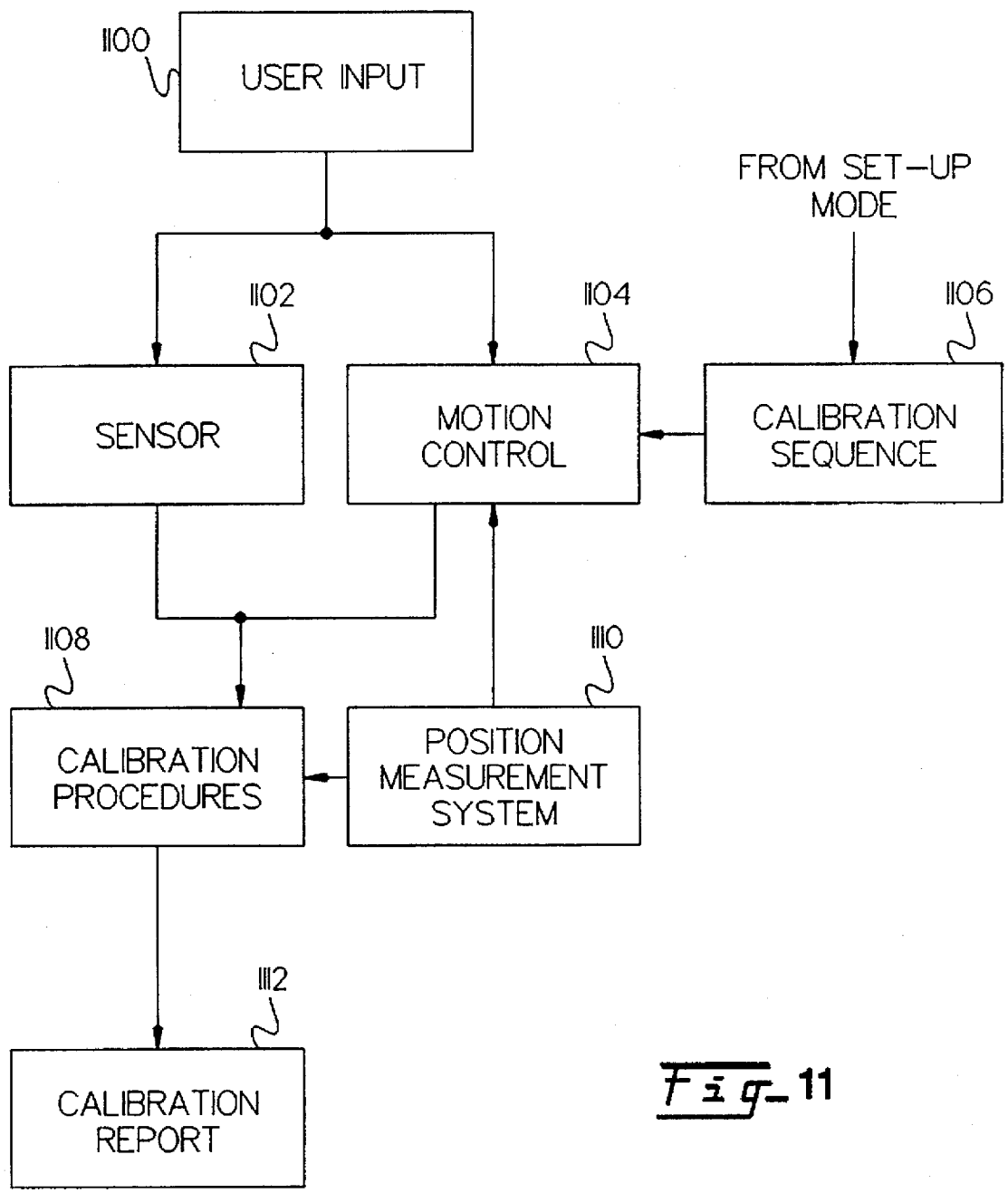
FIG. 11 shows a process flow diagram of the calibration mode of the apparatus of the invention.

Now referring to FIG. 11 which shows a calibration mode of the invention. The process starts at block 1100 which shows user input. The process then flows to subfunction 1102 or 1104 where the sensors perform the calibration procedure or the user, per calibration sequence 1106, controls motion at 1104. In either case, the process flows to block 1108 where the calibration procedures are performed. The calibration procedures also take information from the position measurement system at 1110. After calibration procedures are accomplished a calibration report is produced at 1112.

In calibration mode the system is stepped through a set of procedures which are designed to determine error correction factors which will be applied to subsequent measurements. The calibration procedures are determined from the operator input during the set-up phase (FIG. 10). The part measurements to be made require the system to move along a certain path in configuration space. The algorithms which determine the calibration sequence examine the path and calculate the error sources along the path which are likely to significantly affect the outcome of the measurement. The errors arise from distortions in the apparatus due to temperature changes, due to the weight of the part to be measured, due to wear in the mechanical components of the system, and due to the limits in resolution of the laser sensor and the motion control system.

The calibration procedures are a two phase approach based on a physical artifact in phase one and a software image in phase two. In phase one of the calibration method of the invention a physical artifact is first created that has a known dimension to a high degree of accuracy. The physical artifact is known as a gauge block. The gauge block is scanned with the scanner apparatus of the invention. The gauge block is scanned repeatedly to generate accuracy and repeatability data based on the measurements taken of the gauge block. Since the dimensions of the gauge block are known the apparatus can be calibrated. Once the apparatus is calibrated with the gauge blocks, an additional calibration can be done using the database of the method and apparatus of the invention. Software images of the perfect thread are generated in the database which is pseudo scanned. The software image of the perfect thread is pseudo scanned repeatedly to generate accuracy and repeatability figures based on the measurements taken of the gauge block. The steps involved in this phase of the calibration are:

1. Generate the Perfect thread to the numerical accuracy of the database.
2. Truncate the perfect thread onto a predetermined grid, this generates a pseudo perfect thread.
3. Adjust the starting point of the scan at random.
4. Scan the pseudo perfect thread.
5. Calculate the anticipated error of system components.
6. Repeat the test 30 times (steps 3 through 5) and generate a calibration of the machine.

The information gathered in the calibration mode is stored in static error matrices which are used for error compensation as the data is gathered.

Figure 12:
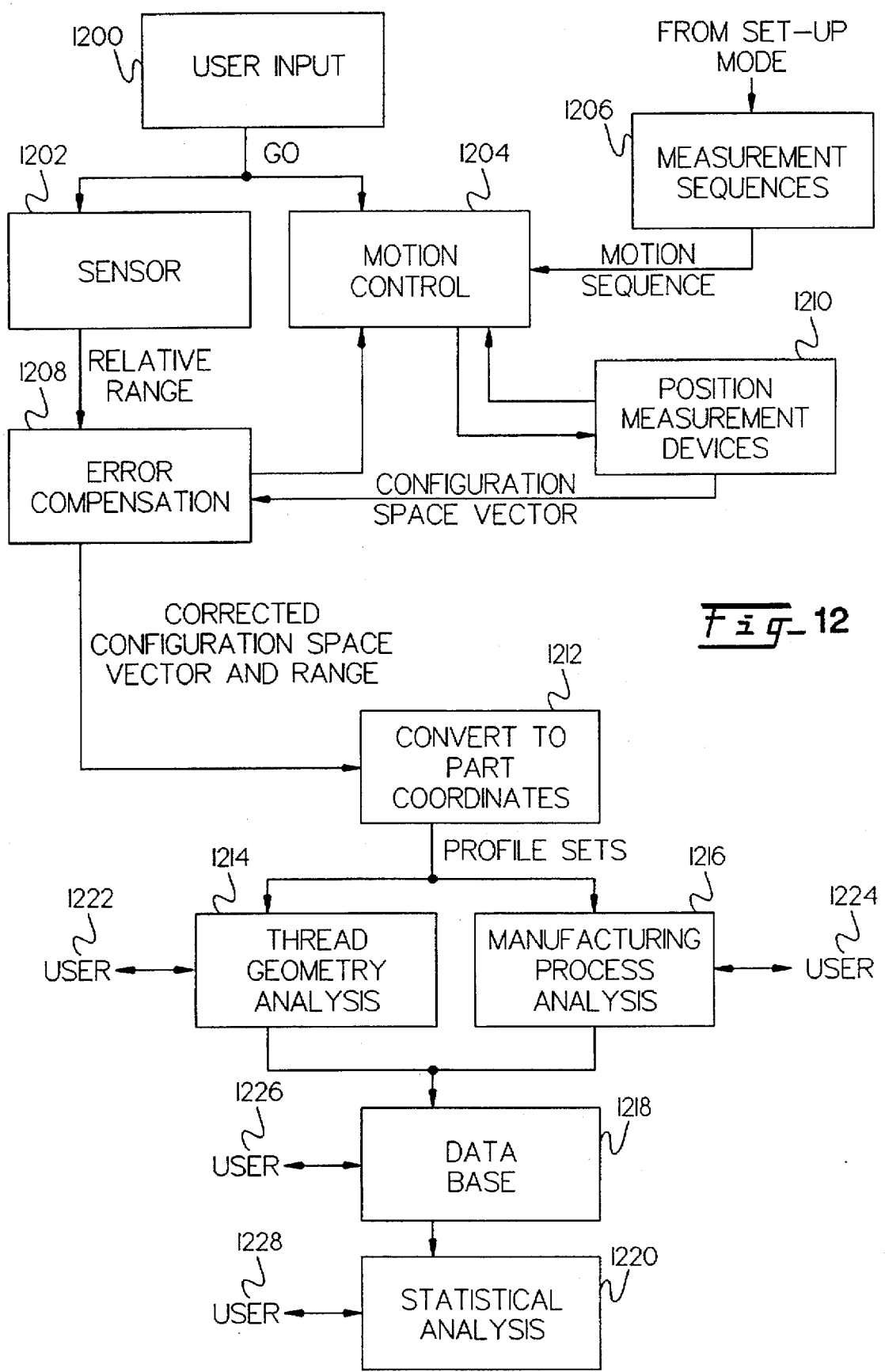
FIG. 12 shows a process flow diagram of the measurement mode of the apparatus of the invention used to generate a thread geometry and manufacturing database.

Now referring to FIG. 12, which shows the measurement mode of the method of the invention, and simultaneously referring to FIG. 2 which shows the apparatus of the invention which can operate in a measurement mode. In measurement mode the user first initializes the thread measurement system. The initialization phase proceeds by first setting the laser triangulation probe 100 to a home position. The home position is a position in space defined as zero in all three coordinates that is safely away from the part stand 120 to avoid being in the way when the part 112 is loaded on the stand 120. The operator then places a part 112 in the thread measurement apparatus of the invention's stand 120 and strikes the GO key. The initialization phase then proceeds by slowly moving the laser scanner 100 to the position of first measurement. As the part 112 is being scanned the image created by the laser 100 on the CCD is monitored. The position of first measurement is defined as the position at which the image of the laser on the CCD is at the center of the CCD. The part is slowly moved in a path that is dependent on its geometry. For example a gear would require slow movement in the horizontal direction. The part could have been inserted with a material handling system. The system then executes the measurement sequence calculated during the set-up mode. The thread measurement system of the apparatus of the invention is now ready to execute the measurement procedures.

Now referring again to the measurement mode process shown in FIG. 12. The process starts at block 1200 where the user inputs a start signal and the process either flows to a sensor control 1202 or a motion control 1204 controlled by the user. Motion sequences are then fed to motion control 1204. Motion sequences are defined as the tool path, of the scanner that is determined by either the user or through computation. Motion is accomplished by the actuators shown in FIG. 2. In either case, there is a bi-directional link between position measurement devices 1210 and 1204 and the motion control process 1204. The position measurement devices, incorporated in the apparatus of FIG. 2, provide a space vector, composed of a scaler representing the position of the scanner in each axis of motion, to the error compensation block 1208, which also takes information from the sensor 1202. The error compensation block 1208 which performs a total least squares analysis presents a corrected configuration space vector to a process 1212 that converts the corrected configuration space vector into part coordinates. The part coordinates 1212 are then assembled into profile sets and thread geometry analysis 1214 is performed. Thread geometry analysis involves some user input discussed above and involves compiling data concerning root, flank and crest. The information is then sent to the thread data base at 1218 and statistical analysis 1220 is performed on the thread database 1218. The user can input data to the data base at 1226 and can interact with a statistical analysis process at 1220 and 1228.

As the data is gathered it is corrected using either STATIC or DYNAMIC error correction methods, and then is converted to the reference frame of the part 1212. Depending on the user's selection of INTERACTIVE or FORM mode for data analysis, the measurement data will be displayed on the screen in the form of a graph, or the values of thread form parameters such as root radius or pitch, helix variation and the like are displayed. When the data is to be analyzed interactively the user selects from a menu quantities to be measured such as pitch, and then indicates with a cursor the segment of the data graph which is to be analyzed to arrive at a value.

One embodiment of the method of the invention is available from Apeiron Inc. of Vadnais Heights, Minn. as The Laser Scanning Thread Measurement System (TMS). TMS was developed as a non-contact device, requiring little training, for rapidly acquiring quantitative information on the form characteristics of thread form. Two versions of the apparatus of the invention are available from Apeiron Inc. A portable bench top unit and an on-line unit.

Benchtop Unit

The portable unit which can be operated by a machinist or inspector to measure a family of threaded fasteners. The thread characteristics which can be measured by the device include helix variation, flank angle, surface roughness, root radius, crest radius, pitch, pitch diameter, major diameter, minor diameter. In the operation of this embodiment the operator loads a part into the unit, initiates a measurement cycle, and then removes the part from the unit.

On-Line

The On-Line unit can be attached to a machine producing threaded fasteners, gears, or cold forming dies. The unit executes a measurement cycle under the instruction of the machine operator or a higher level controller. Parts are fixtured automatically. The TMS may be enclosed in a housing to protect it from debris and fluids associated with the manufacturing process.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for determining crest height of a thread form for use in a computer controlled precision thread form analysis machine, the crest height determining method comprising the steps of:

(a) generating a thread profile array wherein the thread profile array includes a plurality of data points including a first data point and including array height data;

(b) initializing the first data point from the thread profile array;

(c) analyzing a first difference of the array height data for all elements of the thread profile array;

(d) comparing the first difference of array height data with a predetermined crest threshold and outputing a compared value;

(e) building a crest array of indices from the coupled to the compared output, where the compared value indicates that the predetermined crest threshold is less than the first difference of array height;

(f) reporting error if the predetermined crest threshold is exceeded; and (g) storing the crest array of indices.

2. The method of claim 1 wherein the step of calculating the first difference of height array data of the thread profile array comprises the steps of:

(a) reading in the thread profile array;

(b) computing a difference between any position in the thread profile array from the next position in the thread profile array; and (c) scanning the thread profile array from a first position to a last position.

3. The method of claim 2 further including a method for extracting crest values, flank values and root values from the thread profile array comprising the steps of:

(a) reading in the thread profile array;

(b) evaluating a crest of the thread profile array wherein a crest is evaluated by forming first and second differences of thread height and the crest is defined by the first difference being nearly 0, and producing crest value as a result of said crest evaluation;

(c) evaluating a flank of the thread profile array wherein a first flank is defined as having a constant negative slope with the second difference of array height in the area of the first flank near 0, and wherein a second flank is defined as having a constant positive slope with the second difference of array height in the area of the second flank near 0, and producing a flank value as a result of said flank evaluation;

(d) evaluating a root of the thread profile array wherein the thread profile array is a two dimensional array, and wherein the root is defined as the end of the second flank and the start of the next first flank, and producing a root value as a result of said root evaluation; and (e) allocating thread feature indices wherein thread features include a list of crest values, root values and flank values repeated for the entire thread profile array.

4. The method of claim 3 wherein the extracting method further includes the step of extracting thread flank features from the thread profile data, the flank features extracting means comprising the steps of:

(a) reading the thread profile array;
(b) scanning a first difference of array height for all elements in the thread profile array and calculating a second difference of array height;
(c) inputting the first difference of array height wherein a condition is checked for whether or not the first difference of array height is less than 0;
(d) checking for a second difference of array height greater than a flank 1 determination where the first difference of array height is less than 0; and
(e) generating a flank 1 array of indices where the second difference of array height is less than a threshold value.

* * * * *